United States Patent [19]

Barton et al.

[11] Patent Number: 4,786,094

[45] Date of Patent: Nov. 22, 1988

[54] MOUNTING CLIP INCLUDING BREAK-AWAY SPACER ELEMENT

[75] Inventors: Billy J. Barton, Royal Oak; Dale R. Daugherty, Fraser; Ronald C. Johnson, Rochester; Scott J. Priest, Royal Oak, all of Mich.

[73] Assignee: Chrysler Motors Corporation, Highland Park, Mich.

[21] Appl. No.: 117,719

[22] Filed: Oct. 6, 1987

[51] Int. Cl.[4] .............................................. B60R 13/02
[52] U.S. Cl. ...................................... 293/128; 24/293; 52/718.1
[58] Field of Search .......................... 293/128; 52/718; 248/224, 231.7, 231.8; 24/293, 297

[56] References Cited

U.S. PATENT DOCUMENTS

| | | | |
|---|---|---|---|
| 3,580,628 | 5/1971 | Rantala | 293/128 |
| 3,606,721 | 9/1971 | Meyer | 52/718 |
| 3,715,572 | 2/1973 | Bennett | 235/150.2 |
| 3,717,473 | 6/1970 | Kistner et al. | 293/128 |
| 3,734,466 | 5/1973 | Mason | 254/89 |
| 3,923,296 | 12/1975 | Oksala et al. | 269/60 |
| 3,968,559 | 7/1976 | Karlsson | 29/430 |
| 4,011,635 | 3/1977 | Meyer | 52/718.1 |
| 4,023,639 | 5/1977 | Perhed | 180/21 |
| 4,044,853 | 8/1977 | Melke | 180/98 |
| 4,094,418 | 6/1978 | Altendorfer et al. | 414/223 |
| 4,322,198 | 3/1982 | Zuber | 414/754 |
| 4,344,498 | 8/1982 | Lindfors | 180/168 |
| 4,363,839 | 12/1982 | Watanabe et al. | 293/128 |
| 4,408,432 | 10/1983 | Carter et al. | 293/128 |
| 4,493,450 | 1/1985 | Yuzui | 228/49 R |
| 4,504,919 | 3/1985 | Fujii et al. | 364/478 |
| 4,530,056 | 7/1985 | MacKinnon et al. | 364/424 |
| 4,593,238 | 6/1986 | Yamamoto | 318/587 |
| 4,593,239 | 6/1986 | Yamamoto | 318/587 |

FOREIGN PATENT DOCUMENTS 2042217A 9/1980 United Kingdom .

OTHER PUBLICATIONS

Copy of cover page and four pages from a brochure of De=Sta=Co Division of Dover Corporation.
Brochure respecting UHC Series Automatic Guided Vehicle System of Conco-Tellus Inc.
A Conco-Tellus publication published in 1985.
Cover page of Truck Talk for Feb., 1987 and an internal page.
A cover page and interior pp. 18 and 19 of a publication prior to Oct. 27, 1985 of AB Volvo.
Page 56 of an Eaton-Kenway publication published prior to 1985.
Pages 155 and 156 of a Volvo publication published prior to Oct. 27, 1985.

*Primary Examiner*—Robert R. Song
*Attorney, Agent, or Firm*—Edward A. Craig

[57] ABSTRACT

A clip mounting structure is provided which is attachable to a vehicle body without use of fixtures. This is done by initially providing the mounting structure with spacer tabs. The spacer tabs are positioned with respect to an available reference location, such as another previously mounted molding or panel. The tabs are breakaway structures and are removed after the mounting structure is secured in place. The clip mounting structure is then used to secure a molding in place.

5 Claims, 1 Drawing Sheet

MOUNTING CLIP INCLUDING BREAK-AWAY SPACER ELEMENT

BACKGROUND OF THE INVENTION

1. Field of the Invention

A clip structure for supporting a molding is attachable to a vehicle body. The clip includes a break-away spacer element which is used for properly locating the clip with respect to other vehicle structure.

2. Prior Art

Conventionally, vehicle moldings are mounted on vehicle exteriors during the manufacturing process by means of full-sized fixtures. The fixtures are used to properly locate the molding on the vehicle body. The fixtures are quite expensive. Additionally, the tolerance range, the accuracy, of fixtures is not as close as desired. Further, fixtures are bulky and heavy and difficult to handle. This latter point results in relatively inefficient use of the time of production workers.

In accordance with the present invention, a clip is provided for supporting moldings, or the like, which does not require the use of a fixture for proper location. This substantially reduces manufacturing costs.

Positionment of the clips is accomplished by providing break-away spacer elements on the clip in the form of locator tabs. The tabs are positioned with respect to an available reference location, such as another previously mounted molding or panel. The break-away nature of the tabs permits easy removal of the tabs after the mounting clip structure is secured in place. A molding is then secured on the clip structure by means of molding clips provided on the moldings. This permits lower cost installation plus custom tailoring of the moldings of each vehicle which takes into account variances in the tolerance of a vehicle build. All vehicles are not dimensionally identical. Thus, it is desirable to locate moldings on the vehicle with reference to the exact physical characteristics of the vehicle which, as above stated, inherently varies from vehicle to vehicle.

SUMMARY OF THE INVENTION

A clip for mounting a vehicle body exterior molding, or the like, is provided. The clip comprises a clip body including means for securement to a molding. Fastening means are provided for securing the clip body to the vehicle body. A spacer element is provided integrally with the clip body. The spacer element has a locator portion spaced from the clip body a distance equal to the desired distance of the clip body from a pre-existing structure on the vehicle body exterior. Preferably, the spacer extends outwardly away from the clip body at an angle and has a corner edge which defines the locator portion.

The spacer element is joined to the clip element by a frangible joint whereby the spacer element may be easily broken away from the clip body after the clip body has been located on the vehicle body exterior and fastened in place the desired distance from the pre-existing structure in the vehicle body exterior.

The frangible joint preferably comprises a portion of the clip of reduced thickness. This reduced thickness is desirably formed at the apex of a V-shaped notch structure with the apex defining a break line. A plurality of clips are desirably mounted on an elongated flexible support strip in spaced apart relationship. Fastening means are provided for each clip and are re effective to secure both the clip and flexible support strip to a vehicle body.

IN THE DRAWING

DETAILED DESCRIPTION OF A PREFERRED EMBODIMENT

Figure 1:
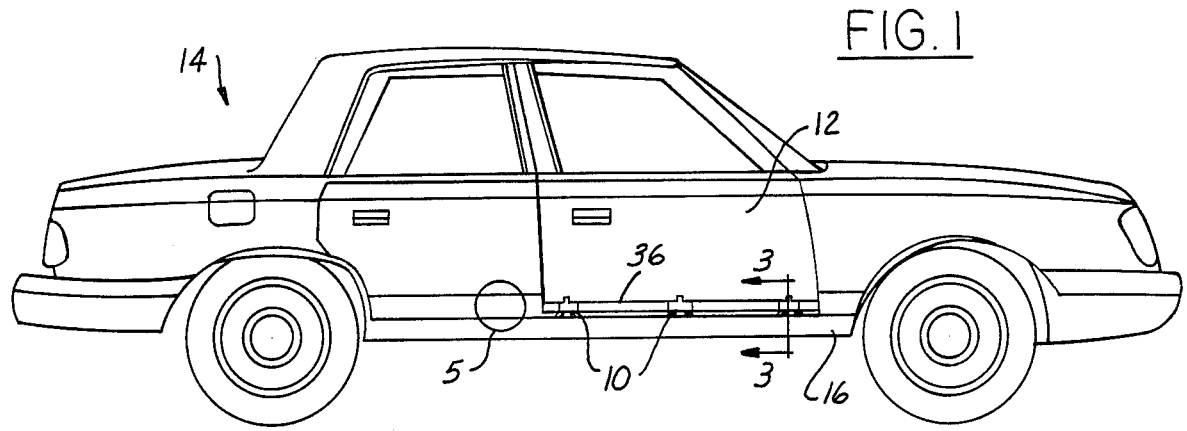
FIG. 1 is a side-elevational view of an automobile illustrating one preferred embodiment of the clip structure of the present invention mounted in place.
Figure 2:
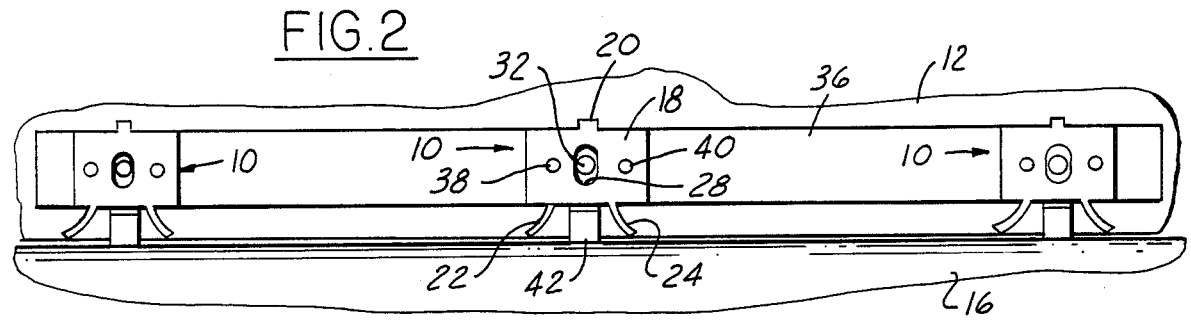
FIG. 2 is an enlarged view of the exposed clip structure mounted on the front right door of the automobile of FIG. 1.

Referring to FIGS. 1 and 2, it will be noted that a plurality of clips 10 are mounted on the front right door 12 of an automobile 14. The clips 10 are mounted adjacent to the lower sill 16 which is used in the present embodiment as a reference location for properly positioning the clips 10. Other pre-existing structure on the vehicle body exterior, such as panels and moldings, may be used for locating purposes depending upon the circumstances of the particular mounting problem. It will be appreciated that it will be necessary to use conventional fixturing devices to mount some of the referenced moldings and the like, the present invention requiring the existence of some vehicle structure to serve as locating means. However, the fixturing problem is considerably reduced in accordance with the present invention even though it is not possible to use the present invention exclusively for mounting of exterior vehicle body structure.

The clip 10 comprises a clip body 18 which is a substantially flat element. A mounting tab 20 extends upwardly from the center of the upper edge of the clip body 18. Flexible downwardly depending outwardly curved arms 22, 24 extend from the lower edge of the clip body 18. The tab 20 and arms 22, 24 function to secure a body side molding 26 in place.

As will be noted, an elongated recess 28 and slot-like opening 30 are provided in the clip body 18. The opening 30 is for the reception of fastening means, illustratively a drill screw 32, which is power driven into the outer door panel 34 and through a flexible support strip 36 after the clips have been properly located to secure the structure to the vehicle door 12. The recess 28 serves to inset the head of the screw 32 while the enlarged opening 30 permits some leeway in driving of the screw 32, that is, the screw does not have to be exactly centered when it is power driven by an operator.

The plurality of spaced apart clips 10 is fastened to the flexible support strip 36 as by means of heat staking in two places 38, 40. Both the clips 10 and strip 36 are fabricated of plastic materials to thereby permit heat staking.

Figure 3:
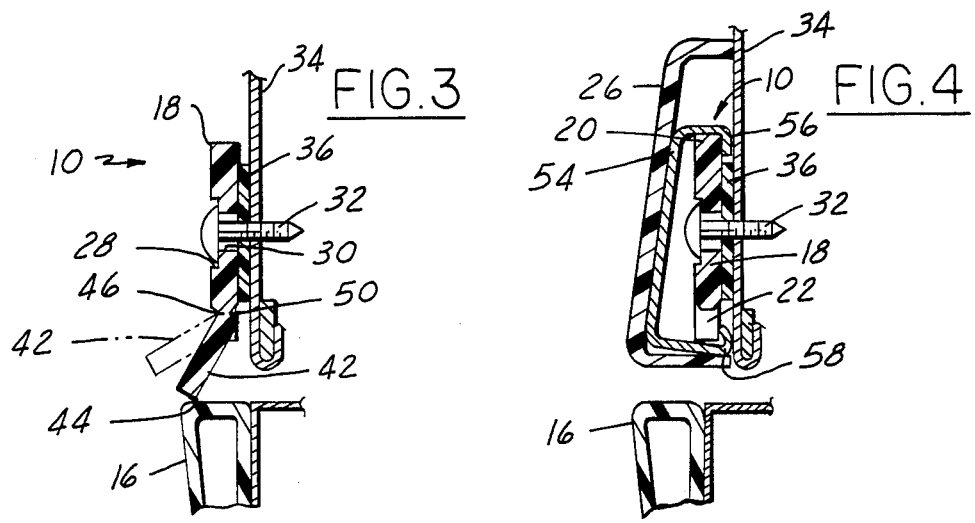
FIG. 3 is a sectional view taken substantially along the line 3—3 of FIG. 1 looking in the direction of the arrows.

A spacer element 42 is provided integrally with the clip body 18. The spacer element, as will be noted in FIG. 3, extends downwardly and outwardly away from the plane of the clip body 18 at an angle thereto. The spacer element has a locator portion, in the form of the lower inner edge 44 of the lower surface of the spacer element 42. The edge 44 is spaced from the clip body 18 a distance equal to the desired distance of the clip body from the pre-existing structure in the form of the lower sill 16 on the vehicle body exterior. This distance, which may be calculated in each application, results in positioning the molding 26 in the desired location with respect to the lower sill 16. As will be appreciated, if there are dimensional variations in the vehicle build, one end of the lower sill 16 may be slightly higher than the other. If this is true, then the molding 26 will still be parallel to the sill 16 and at the desired distance therefrom to create the desired visual effect. This, in effect, amounts to custom mounting of each molding to suit the conditions of the automobile door 12 upon which it is mounted.

The clip 10 is preferably injection molded of a plastic material such as ABS or nylon. Other materials may be used as desired and as functional with the present invention.

The spacer element 42 is joined to the clip body 18 by means of a frangible joint 46. The term "frangible" is used in the sense of easily breakable. To obtain a frangible joint in the present invention, a portion of the clip is of reduced thickness. This is obtained by means of providing V-shaped notches on either side of the clip body with the apexes defining a break line 50. After the clips 10 have been properly located with respect to the lower sill 16, drill screws 32 are driven through the support strip 36 and door panel 34. This secures the structure in place. At this point, the spacer elements 42 are broken away and are discarded. This is accomplished by bending the spacer elements 42 outwardly as shown in dotted lines in FIG. 3 until the joint 46 fractures.

Figure 4:
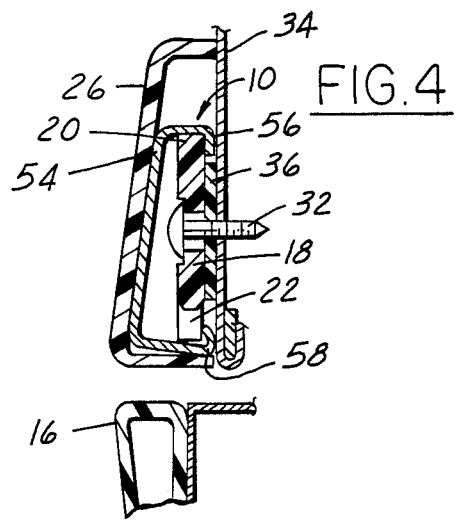
FIG. 4 is a view similar to FIG. 3 with the spacer element broken away and with the body side molding mounted on the clip structure.
Figure 5:
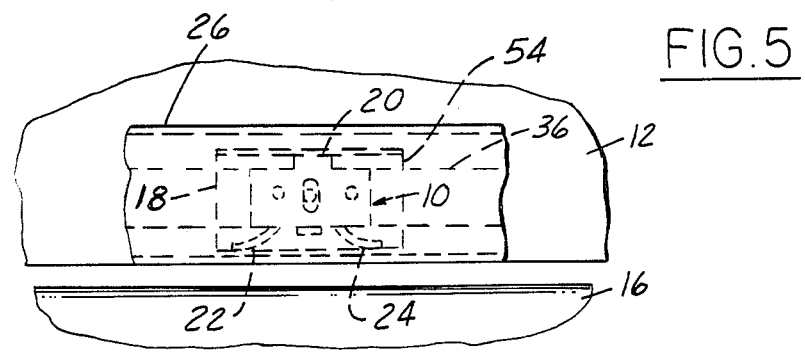
FIG. 5 is a view on an enlarged scale of the structure defined by the circle labeled 5 of FIG. 1.

After removal of the spacer elements 42, the molding 26 may be mounted on the clips. The molding 26, shown as a plastic extrusion, is generally C-shaped. Molding clips 54 are secured within the molding 26 as by adhesion. The molding clips 54 are also C-shaped and have retaining lips 56, 58 provided on the outer edges thereof. In mounting the molding 26, the clips 54 are first positioned beneath the clip arms 22, 24. The molding is then pushed upwardly whereupon the arms 22, 24 will give way. After the upper portion of the clips 54 has passed above the tab 20, the clip and molding are lowered to thereby secure the molding in place as shown in FIGS. 4 and 5.

We claim:

1. A clip for mounting a vehicle body exterior molding, or the like, comprising a clip body including means for securement to a molding, fastening means for securing the clip body to a vehicle body, a spacer element integral with the clip body, the spacer element having a locator portion spaced from the clip body a distance equal to the desired distance of the clip body from a pre-existing structure on the vehicle body exterior, the spacer element being joined to the clip body by a frangible joint whereby the spacer element may be easily broken away from the clip body after the clip body has been located on the vehicle body exterior and fastened in place the desired distance from said pre-existing structure on the vehicle body exterior.

2. A clip as defined in claim 1, further characterized in that the frangible joint comprises a portion of the clip of reduced thickness.

3. A clip as defined in claim 2 further characterized in that said reduced thickness is formed at the apex of a V-shaped notch structure, said apex defining a break line.

4. A clip as defined in claim 1 further characterized in that the spacer element extends outwardly away from the clip body at an angle, the spacer element having an edge which defines the locator portion.

5. The combination comprising a clip as defined in claim 1, an elongated flexible support strip, a plurality of said clips being mounted thereon in spaced apart relationship, said fastening means being provided for each clip and being effective to secure both the clip and flexible support strip to a vehicle body.

* * * * *